April 22, 1958     G. R. STUTZMAN     2,832,056
ROTARY FLUID SEAL
Filed May 31, 1956
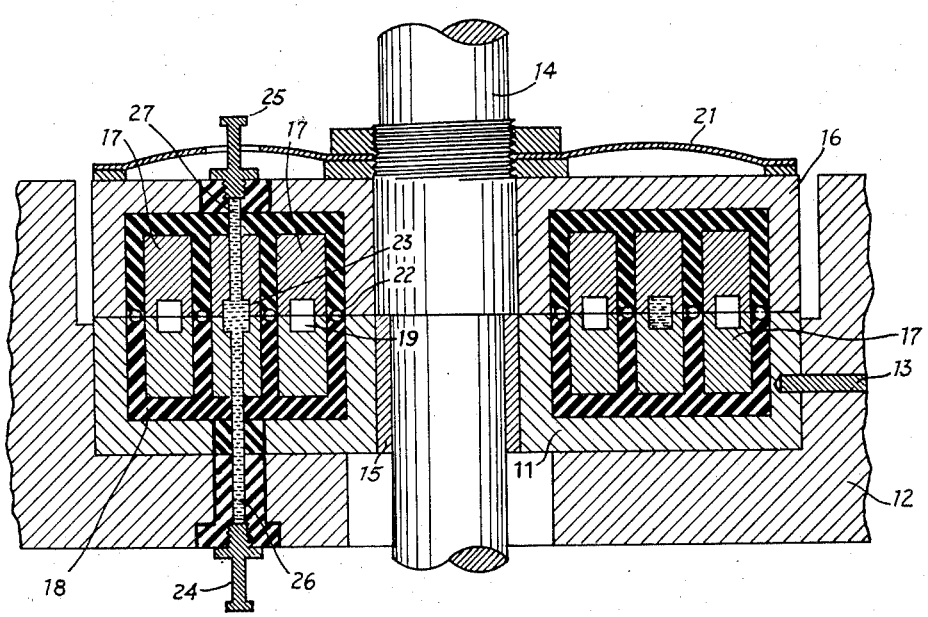
INVENTOR.
GUY R. STUTZMAN
BY *J. D. O'Brien*
*H. H. Losche*
ATTORNEYS

United States Patent Office 2,832,056
Patented Apr. 22, 1958

2,832,056

ROTARY FLUID SEAL

Guy R. Stutzman, Greenwood, Ind.

Application May 31, 1956, Serial No. 588,588

5 Claims. (Cl. 339—5)

(Granted under Title 35, U. S. Code (1952), sec. 266)

The invention described herein may be manufactured and used by or for the Government of the United States of America for governmental purposes without the payment of any royalties thereon or therefor.

The present invention relates to a sealing device, and more particularly to a device for sealing fluids between a stationary element and a rotating element.

Heretofore it has been customary to employ a sealing gasket of rubber or other flexible material in order to make a leak-proof joint. However, the use of these materials had various disadvantages, the main one being that the material would wear or decompose, which subsequently resulted in a leakage of the various fluids being transmitted.

The present invention provides a combination device for movement of various fluids such as air or oil, and also can readily be used as a slip ring assembly for transmitting currents. The rotary seal consists of two main elements, a bottom stationary element and a matched upper element that is rotatable. A multiple number of grooves are provided in each element, and it is within these grooves that the various fluids are conveyed. The lands between the grooves are precisionally lapped and a very thin coating of lubricant is applied to these lapped surfaces from an oil reservoir. Each of the grooves is machined in a separate annular ring of metal, such as tool steel, and these metallic rings are electrically insulated from one another. The grooves can be filled with mercury and thus a slip ring assembly can readily be devised. A disk type spring is employed to keep the two main elements together and thus form the passageways for the various fluids that are to be carried therein.

It is therefore a general object of the present invention to provide an improved type of seal between a stationary and a rotating element.

Another object is to provide a device that can readily be used to carry various fluids and which can readily be used as a slip ring assembly.

Other objects and many of the attendant advantages of this invention will be readily appreciated as the same becomes better understood by reference to the following detailed description when considered in connection with the accompanying drawing wherein the figure shows an axial section through a preferred form of the sealing device.

Referring now to the drawing, an embodiment of the present invention is shown in the form of a turntable wherein a lower disk 11 is attached to a housing 12 by means of a dowel pin 13. A rotatable shaft 14 is journaled in a bushing 15, and an upper disk 16 is attached to shaft 14 and is rotated therewith.

The lower disk 11 and the upper disk 16 each are provided with a plurality of metallic rings 17, which are preferably made from tool steel. Three rings in each disk are shown in the drawing for the purpose of illustration; however, it should be understood, of course, that a lesser or greater number would work equally well. The metallic rings 17 are insulated from one another, and from the disks, by means of insulation 18. One method of fabrication would be to embed the rings 17 in a thermosetting resin that would have good electrical insulating properties. Each metallic ring 17 has a groove 19 cut therein, and it is within these grooves that fluids are carried. The top surfaces of both disks are precisionally lapped which permits the disks to come into intimate contact, and it is these lapped surfaces that prevent the leakage of fluids from the grooves 19.

A dish-shaped spring-washer 21 is provided to bias the upper disk 16 in contact with the lower disk 11. Since the upper disk 16 is rotatably driven by the shaft 14, the disk 16 is preferably keyed to shaft 14 so that there can be motion in the longitudinal direction of the shaft, thus permitting the spring-washer 21 to bias the upper disk 16 against the lower disk 11. A small semi-circular groove 22 is provided adjacent each groove 19, and these grooves serve as reservoirs for a lubricant that is applied thinly on the lands of the seal.

As illustrated in the drawing, the middle groove 19 is shown filled with mercury 23, and a pair of terminals 24 and 25 are electrically connected by columns of mercury 26 and 27, respectively. Thus it can be seen that the device can readily be used as a slip-ring assembly between the stationary disk 11 and the rotatable disk 16. The terminals 24 and 25 can readily be removed by unscrewing, and the mercury drained, and, by replacing the terminals with hose connections, water, oil, air, or other fluids can be carried to the rotatable disk 11.

In operation, the hose connections are connected to a source of fluid supply, such as a water line or an air compressor. If the device is to serve only as a slip ring assembly, a required number of grooves can be filled with mercury, as shown in the middle groove of the device illustrated in the drawing. Thus it can be seen that the device illustrated can be used for multiple purposes and has much flexibility.

Obviously, many modifications and variations of the present invention are possible in the light of the foregoing disclosure. It is therefore to be understood that the invention may be practiced otherwise than as specifically described.

What is claimed is:

1. A rotary sealing device comprising, a stationary disk and a rotating disk each having lapped surfaces in mating contact, a plurality of passageways formed by a plurality of opposed grooves in said disks means within at least one of said grooves for conducting current between said stationary disk and said rotating disk, means for providing a film of lubrication on said lapped surfaces in mating contact, and spring means for biasing said rotating disk against said stationary disk.

2. A rotary sealing device as set forth in claim 1 wherein said means within at least one of said grooves for conducting current includes a supply of liquid mercury whereby said mercury is adaptable for conducting current between first and second terminals mounted respectively on said stationary and said rotating disks.

3. A rotary fluid seal comprising, a first circular disk, a rotatable shaft journaled through said first disk, a second circular disk attached to said rotatable shaft and rotatable therewith, a plurality of annular rings of metallic material attached to said first and second disk, each said annular ring having a groove on the face thereof, each groove on the rings attached to said first disk being opposed to a corresponding groove on said second disk whereby a plurality of enclosed circular passageways are formed, means for electrically insulating each said annular ring from the attached circular disks and the other said rings attached to the same circular disk, and spring means for biasing said second circular disk in sealing contact with said first circular disk.

4. A rotary fluid seal as set forth in claim 3 wherein said spring means for biasing said second circular disk in sealing contact with said first circular disk comprises a dish-shaped spring-washer attached to said rotatable shaft.

5. A rotary sealing device as set forth in claim 3 wherein at least one of said enclosed circular passageways contains liquid mercury for conducting current between said first and second circular disks.

References Cited in the file of this patent

UNITED STATES PATENTS

| | | |
|---|---|---|
| 1,876,515 | Emmet | Sept. 6, 1932 |
| 2,033,403 | Smittle | Mar. 10, 1936 |
| 2,249,188 | Stevenson | July 15, 1941 |
| 2,679,412 | Whitfield | May 25, 1954 |
| 2,719,738 | Myers | Oct. 4, 1955 |

FOREIGN PATENTS

| | | |
|---|---|---|
| 323,365 | Great Britain | Jan. 2, 1930 |